United States Patent Office 3,055,874
Patented Sept. 25, 1962

3,055,874
THIOCHLORAL AND POLYMERS THEREOF
Edward G. Howard, Jr., Hockessin, Del., assignor to E. I. du Pont de Nemours and Company, Wilmington, Del., a corporation of Delaware
No Drawing. Filed Nov. 6, 1959, Ser. No. 851,230
15 Claims. (Cl. 260—79)

This invention relates to new compositions of matter and to their preparation. More particularly, the invention is concerned with thiochloral, its polymers and copolymers, and with their preparation.

The chemistry of the sulfur analogs of the ketones and aldehydes has eluded study because they have not heretofore been believed to exist in the monomeric state. In fact, E. Campaigne, Chem. Rev. 39, 1 (1946), has stated that it was "highly questionable whether any alkyl thials have ever been prepared." A particularly interesting polyfunctional thiocarbonyl compound and haloalkane is thiochloral. Its chemistry should prove a fruitful subject of research. However, little is known about thiochloral because it has not heretofore been prepared and isolated for study.

It is an object of this invention to prepare monomeric thiochloral and to isolate and characterize it. Another object is to prepare polymers and copolymers of thiochloral. Still another object is to provide convenient methods for preparing thiochloral.

These and other objects are accomplished by passing 1,2,2,2-tetrachloroethyl-t-butylthioether over a solid dehydration catalyst heated to above 60° C. and recovering the resulting thiochloral at temperatures of the order of −80° C. These same objects can also be accomplished by reacting 1-hydroxy-2,2,2-trichloroethyl thiolacetate with concentrated sulfuric acid, phosphoric acid, phosphorus trichloride, or other dehydrating acid, distilling the mixture, and recovering the thiochloral in a receiver cooled to −80° C. The thiochloral obtained by either process is a lavender-colored liquid with an absorption maximum in the visible spectrum at 548 m$\mu$ and an extinction coefficient above 60.

In the embodiment of this invention employing solid dehydration catalysts, a tubular reactor is packed with the solid dehydration catalyst, e.g., silica-alumina, and connected to a receptacle cooled in a solid carbon dioxide-acetone mixture. The charged reactor is heated to between 60° and 150° C. and 1,2,2,2-tetrachloroethyl-t-butylthioether is then passed over the heated catalyst, preferably under reduced pressure. The desired thiochloral is collected as a lavender-colored liquid in the reservoir cooled in the solid carbon dioxide-acetone bath.

The heterogeneous solid catalysts used in preparing the thiochloral of this invention by the above method are the acids and salts of elements of the third, fourth, fifth, sixth, and eighth groups of the periodic table which are art recognized as dehydration catalysts. Examples are the oxides of aluminum, silicon, tungsten, titanium, molybdenum, zirconium, thorium, and berylium, basic aluminum sulfate, and the borophosphoric acids of U.S. 2,200,734. These oxides and salts may be used alone or in admixture with one or more dehydrating oxides, e.g., silica-on-alumina, vanadia-on-thoria, vanadia-on-silica, vanadia-on-alumina, berylium oxide-on-alumina, zirconium oxide-on-silica, etc.

The periodic table referred to herein is that set forth in Deming's "General Chemistry," John Wiley & Sons, Inc., 5th ed., chapter 11.

As generally prepared, these dehydrating oxides are in the form of hard, porous, noncrystalline gels and are characterized by a high degree of ruggedness, i.e., they resist to a remarkable extent erosion during use.

Monomeric thiochloral can be stored at temperatures of the order of −80° C. When allowed to warm to 0° C., it polymerizes in 4 to 6 hours. At normal room temperatures, i.e., 28–30° C., the polymerization is faster. The polymer obtained is a solid which is inert to attack by cold or hot aqueous alkalis, concentrated nitric acid, or triethylamine. The polymer is soluble in chlorinated organic solvents, particularly chloroform, and self-supporting films can be cast from these solutions.

The polymer can also be converted into filaments from solution or by melt spinning. These fibers are employable in weaving and other uses for which fibers are known to be useful.

As already indicated, monomeric thiochloral is obtained when 1,2,2,2-tetrachloroethyl-t-butylthioether is passed over a solid dehydration catalyst at temperatures in the range of 60 to 150° C. and generally at temperatures of 80 to 130° C. Temperatures in excess of 150° C. are not used because above this temperature side reaction product formation becomes increasingly important, with consequent reduction in the yield of desired product.

In practice, it is desirable to maintain as short a contact time as possible between the 1,2,2,2-tetrachloroethyl-t-butylthioether and catalyst. This is conveniently done by operating under reduced pressure. The use of reduced pressures is also advantageous because it makes possible more effective use of the equipment by increasing its throughput capacity. As a rule, pressures are used which are of the order of 0.1 to 50 mm., but there is nothing critical about this and lower or higher pressures may be used, if desired.

As already stated, the thiochloral may be permitted to form homopolymers by simply letting it warm to 0° C. and letting it stand for 4 to 6 hours or by warming to room temperature. It can also be caused to form copolymers with other polymerizable thiocarbonyl compounds, e.g., difluorothioacetyl fluoride, trifluorothioacetyl fluoride, pentafluorothiopropionyl fluoride, chlorodifluorothioacetyl fluoride, pentafluorothio-3-butenoyl fluoride, perfluorobutanethione, 4H-heptafluoro-2-butanethione, hexafluorothioacetone, and the like, by allowing the comonomer mixture to warm to room temperature in the presence of high energy radiation. These copolymers can be cast into self-supporting films. They can also be converted into filaments similarly to the homopolymer.

The examples which follow illustrate but do not limit this invention.

*Example 1*

A heat-resistant glass tube was packed along 10 inches of its length with a high surface commercial silica-alumina catalyst and attached in sequence to two traps, the first cooled in a solid carbon dioxide-acetone mixture and the second in liquid nitrogen. Over a 4½-hour period 86 g. of 1,2,2,2-tetrachloroethyl-t-butylthioether, prepared as described subsequently, was passed over the catalyst at 96 to 105° C. under a pressure which ranged from 0.5 mm. initially to 4.7 mm. at the end. The solid carbon dioxide-acetone trap contained unreacted starting material and lavender-colored liquid, which was monomeric thiochloral. After allowing the system to attain atmospheric pressure, the solid carbon dioxide-acetone trap was allowed to attain ambient temperature, which caused the monomeric thiochloral to lose its lavender color. Upon addition of petroleum ether to the now colorless liquid, 3.5 g. of a white thiochloral polymer separated. The remainder of the product in the trap weighed 62 g. and was unreacted starting material. The visible spectrum of the thiochloral product shows the presence of a broad absorption band with a peak at 548 m$\mu$.

The 3.5 g. of polymer was dissolved in ethanol-free chloroform and reprecipitated by addition of petroleum ether. The precipitate obtained was bright white in color and was dried at 100° C. under 0.5 mm. pressure.

*Analysis.*—Calcd. for $C_2HCl_3S$: C, 14.69%; H, 0.61%; Cl, 65.05%; S, 19.61%. Found: C, 17.95%; H, 1.51%; Cl, 61.20%; S, 18.79%.

The above experiment was repeated using alumina in place of silica/alumina at 114° to 118° C. under 1.5 to 1.7 mm. pressure with analogous results.

The polymer had an inherent viscosity of 0.62 at 0.5% concentration by weight/volume in chloroform.

Self-supporting films cast from chloroform solutions of the thiochloral polymer prepared as above are translucent. Fibers can be melt-extruded from the polymer.

The polymer is resistant to hot and cold concentrated nitric acid, trimethylamine, and 10% aqueous sodium hydroxide. When heated under a vacuum of about 0.5 mm. at temperatures up to 150° C., the polymer does not degrade, as evidenced by visual examination.

The 1,2,2,2 - tetrachloroethyl-t-butylthioether used in preparing the monomeric thiochloral was produced according to the reactions indicated in the following schematic equations:

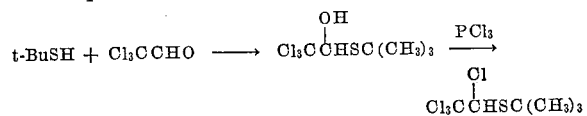

To 1172 g. (8 moles) of chloral there was added carefully with cooling 720 g. (8 moles) of tert.-butylmercaptan. To the resulting solid there was added 1200 g. (8.7 moles) of phosphorus trichloride. Hydrogen chloride was evolved slowly and the solid disappeared. The clear liquid was decanted from the small amount of thick gum in the bottom of the flask. The excess phosphorus trichloride was removed by vacuum distillation and the product distilled, B.P. 80–82° C./0.75 mm., 1697 g. (83% yield).

*Analysis.*—Calcd. for $C_6H_{10}Cl_4S$: S, 12.53%; Cl, 55.40%. Found: S, 12.55%; Cl, 55.83%.

The nuclear magnetic resonance spectrum shows the compound to have two different kinds of hydrogen in ratio of 9:1.

The procedure which employs 1-hydroxy-2,2,2-trichloroethyl thiolacetate as a monomeric thiochloral precursor is illustrated below.

Example II 1-hydroxy-2,2,2-trichloroethyl thiolacetate was mixed with phosphorus trichloride, subjected to distillation, and the product collected in two vessels, one cooled in a solid carbon dioxide-acetone mixture and the other in liquid nitrogen. The lavender-colored liquid which collected in the solid carbon dioxide-acetone trap was identified as thiochloral by its color and conversion to its polymer.

The above experiment was repeated using concentrated sulfuric acid in place of phosphorus trichloride. The lavender-colored product obtained was identified as thiochloral by its characteristic lavender color and conversion to polymer.

In place of the phosphorus trichloride there can be used such other dehydrating acids as concentrated sulfuric, phosphoric, and the like.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The compound thiochloral, said compound being characterized by being a lavender-colored liquid at temperatures of about −80° C., possessing an absorption maximum in the visible spectrum at 548 m$\mu$ and an extinction coefficient above 60, and readily polymerizing upon being allowed to warm to room temperature.

2. Polymeric thiochloral, of the addition type capable of being formed into filaments and self-supporting films.

3. Homopolymers of thiochloral of the addition type and capable of being formed into filaments and self-supporting films, said homopolymers being characterized by being inert to attack by any member of the class consisting of cold aqueous alkali, hot aqueous alkali, concentrated nitric acid, and triethylamine, and by being soluble in chlorinated organic solvents.

4. A homopolymer of claim 3 in the form of a self-supporting film.

5. A homopolymer of claim 3 in the form of a filament.

6. Copolymers of thiochloral with a polymerizable polyfluorohalothiocarbonyl compound, selected from the group consisting of polyfluorohalothiocarbacyl fluorides and polyfluorohaloalkyl thioketones, said copolymers being of the addition type and capable of being formed into filaments and self-supporting films.

7. A copolymer of claim 6 in the form of a self-supporting film.

8. A copolymer of claim 6 in the form of a filament.

9. A process for preparing thiochloral which comprises effecting contact at a temperature in the range of 60–150° C. between a dehydrating substance and a polychloroethylthio compound of the class consisting of 1,2,2,2-tetrachloroethyl-t-butylthioether and 1-hydroxy-2,2,2-trichloroethyl thiolacetate and recovering the resulting thiochloral in a receiver cooled to about −80° C.

10. Process which comprises passing 1,2,2,2-tetrachloroethyl-t-butylthioether over a solid dehydration catalyst heated in the range of 60–150° C. and recovering the resulting thiochloral at temperatures of the order of −80° C.

11. Process of claim 10 in which the 1,2,2,2-tetrachloroethyl-t-butylthioether is passed over a heterogeneous solid dehydration catalyst under reduced pressure, the catalyst being heated to 60–150° C.

12. Process which comprises mixing at a temperature in the range 60–150° C. 1-hydroxy-2,2,2-trichloroethyl thiolacetate with a strong dehydrating agent of the class consisting of phosphorus trichloride, sulfuric acid and phosphoric acid and recovering the resulting thiochloral at temperatures of the order of −80° C.

13. A homopolymer of claim 3 having an inherent viscosity of 0.62 at 0.5% concentration by weight/volume in chloroform.

14. A copolymer of claim 6 wherein the polymerizable polyfluorohalothiocarbonyl compound is a polyfluorohalothiocarbacyl fluoride.

15. A copolymer of claim 6 wherein the polymerizable polyfluorohalothiocarbonyl compound is a polyfluorohaloalkyl thioketone.

References Cited in the file of this patent

UNITED STATES PATENTS

| 1,991,765 | Marks | Feb. 19, 1935 |
| 2,568,500 | Hasted et al. | Sept. 18, 1951 |

FOREIGN PATENTS

| 480,360 | Canada | Jan. 22, 1952 |